United States Patent
Miyamoto et al.

(10) Patent No.: US 8,327,097 B2
(45) Date of Patent: Dec. 4, 2012

(54) DATA BACKING UP FOR NETWORKED STORAGE DEVICES USING DE-DUPLICATION TECHNIQUE

(75) Inventors: Takahiro Miyamoto, Saitama (JP); Michiaki Hayashi, Saitama (JP)

(73) Assignee: KDDI Corporation, Tokyo (JP)

( * ) Notice: Subject to any disclaimer, the term of this patent is extended or adjusted under 35 U.S.C. 154(b) by 943 days.

(21) Appl. No.: 12/392,280

(22) Filed: Feb. 25, 2009

(65) Prior Publication Data

US 2009/0217091 A1 Aug. 27, 2009

(30) Foreign Application Priority Data

Feb. 26, 2008 (JP) ................... 2008-043829

(51) Int. Cl.
*G06F 12/00* (2006.01)
(52) U.S. Cl. .................. 711/162; 707/664; 711/E12.01; 711/E12.103
(58) Field of Classification Search .......... None
See application file for complete search history.

(56) References Cited

U.S. PATENT DOCUMENTS

| | | | |
|---|---|---|---|
| 7,567,188 B1 * | 7/2009 | Anglin et al. ................ 341/63 |
| 2007/0208788 A1 | 9/2007 | Chakravarty et al. | |

FOREIGN PATENT DOCUMENTS

| | | | |
|---|---|---|---|
| JP | 4-259048 A | 9/1992 |
| JP | 7-271523 A | 10/1995 |
| JP | 2003-524243 A | 8/2003 |
| JP | 2003-524968 A | 8/2003 |
| JP | 2007-079902 A | 3/2007 |
| JP | 2007-234026 A | 9/2007 |
| WO | 01/61518 A1 | 8/2001 |
| WO | 01/61563 A1 | 8/2001 |

* cited by examiner

*Primary Examiner* — Midys Rojas
*Assistant Examiner* — Thanh D Vo
(74) *Attorney, Agent, or Firm* — Westerman, Hattori, Daniels & Adrian, LLP

(57) ABSTRACT

A technique of backing up data for networked storage devices using de-duplication is disclosed in which a communication device divides a to-be-stored new file into data blocks, defines and updates a statistical value representative of a history of reference to each data block within previous files, and transmits the statistical value to another communication device. The communication device, upon reception of the statistical value, selects a preloaded data block, based on the received statistical value, and transmits to another communication device a copying request for making a copy of a real data block identical to the preloaded data block. The communication device, upon reception of the copy, stores the copy as the preloaded data block.

15 Claims, 5 Drawing Sheets

DATA BACKING UP FOR NETWORKED STORAGE DEVICES USING DE-DUPLICATION TECHNIQUE

CROSS-REFERENCE TO RELATED APPLICATIONS

The present application is based on and claims the benefit of priority from Japanese Patent Application No. 2008-043829 filed Feb. 26, 2008, the content of which is incorporated herein by reference in its entirety.

BACKGROUND OF THE INVENTION

1. Field of the Invention

The invention relates generally to data backing up techniques for networked storage devices using a de-duplication method.

2. Description of the Related Art

For a data file to be backed up in a storage device hosted by a host device, the data file is divided or partitioned into a plurality of data blocks, each of which is called "chunk" in the storage technology, and is in the form of a bit sequence.

In general, a data file tends to have identical data blocks within the same data file and to share identical data blocks with other data files. Due to this tendency, data backups of a data file or data files are created so as to include many repeated redundant backups of the same data blocks in the same storage device. Such a backup storage device, therefore, requires data storage capacity becoming larger as the system increases in scale.

In recent years, as one of data backup methods, a de-duplication technique has been attracting public interest, wherein the de-duplication technique is also referred to as "commonality factoring," "non-redundant storage," and "duplication data reduction."

The de-duplication technique is implemented, such that, when a new data block is about to be stored in a storage device, if the new data block is duplicate to an already existing data block which has already been stored in the storage device, then the new data block will not be stored, and instead, a pointer (i.e., an address) will be stored for pointing to a memory location at which the already existing data block is located in the storage device.

After the pointer has been stored in the storage device, if the new data block needs to be referenced, a sole use of the pointer allows reference to the memory location of the already existing data block.

This de-duplication technique prevents redundant storage of duplicate data blocks in a storage device, resulting in a reduction in an amount of data to be stored in the storage device for data backup.

There is an environment where storage devices for data backup are connected via a network to a remote and common data center for collective management of data backups. In this environment, backups are made also for the data center, and those backups are transferred to the data center.

The above-described de-duplication technique, when used in such a network-based environment, could result in a reduction in an amount of data to be transferred to the data center for data backup.

FIG. 1 is a sequence diagram illustrating a conventional implementation of the de-duplication technique.

As illustrated in FIG. 1, a host device 3 is connected with a storage device 2 via a storage-control communication device 5. Those devices are linked via I/O interfaces for peripherals. In an example, those interfaces may be SCSIs (Small system Computer System Interfaces), from the protocol perspective, and may be HBAs (Host Bus Adaptors), from the physical perspective.

Those devices operate in the following sequence:

Step S100

At this step, the host device 3 attempts to store a first file (comprised of data blocks [A] (i.e., a first data-block [A]), [B], [C], [A] (i.e., a second data-block [A]) and [D]) into the storage device 2. The communication device 5, upon reception of the first file from the host device 3, recognizes that data blocks [A] and [A] are duplicate to each other, and then stores only the first data block [A] together with data blocks [B], [C] and [D], into the storage device 2, each in the form of a real data block.

In this case, the second data-block [A] is stored into the storage device 2, in the form of, not a real data block, but a pointer pointing to an address at which the first data-block [A] has been stored in the storage device 2.

Step S110

At this step, the host device 3 attempts to store a second file (comprised of data blocks [A], [B] and [E]) into the storage device 2. The communication device 5, upon reception of the second file from the host device 3, recognizes that data blocks [A] and [B] have already been stored in the storage device 2, and then stores only data block [E] into the storage device 2, in the form of a real data block.

In this case, data blocks [A] and [B] that are referenced within the second file are each stored into the storage device 2, in the form of, not real data blocks, but pointers pointing to addresses at which data blocks [A] and [B] have been stored in the storage device 2.

Step S120

At this step, the host device 3 attempts to store a third file (comprised of data blocks [A], [E] and [F]) into the storage device 2. The communication device 5, upon reception of the third file from the host device 3, recognizes that data blocks [A] and [E] have already been stored in the storage device 2, and then stores only the data block [F] into the storage device 2, in the form of a real data block.

In this case, data blocks [A] and [E] that are referenced within the third file are each stored into the storage device 2, in the form of, not real data blocks, but pointers pointing to addresses at which data blocks [A] and [E] have been stored in the storage device 2.

Step S130

At this step, the host device 3 attempts to store a fourth file (comprised of data blocks [B], [G], [c], [D] and [E]) into the storage device 2. The communication device 5, upon reception of the fourth file from the host device 3, recognizes that data blocks [B], [C], [D] and [E] have already been stored in the storage device 2, and then stores only data block [G] into the storage device 2, in the form of a real data block.

In this case, data blocks [B], [C], [D] and [E] that are referenced within the fourth file are each stored into the storage device 2, in the form of, not real data blocks, but pointers pointing to addresses at which data blocks [B], [C], [D] and [E] have been stored in the storage device 2.

One of conventional techniques is for determining whether or not a duplicate data block has already been stored, using various hash algorithms or the like, as disclosed in, for example, Japanese Patent Application Publication Nos. 2003-524243 and 2007-79902.

This conventional technique allows a plurality of devices to share a list of data blocks that have already been stored, to thereby determine whether or not a duplicate data block is present, for avoiding redundant data storage.

Another conventional technique is for assigning a unique name to a series of sets of data blocks using a hash algorithm or the like, to thereby synchronize sets of data blocks between a plurality of systems, as disclosed in, for example, Japanese Patent Application Publication No. 2003-524968.

In this conventional technique, if a new set of data blocks is loaded into one of those systems, and the new set of data blocks bears a name duplicate to that of a previous set of data blocks that has already been stored in the one system, then the new set of data blocks is not stored into the one system.

If the name of the new set of data blocks is not present in the newest version of a management data list sent to the one system from another system, then the one system updates the management data list to include the name. The updated list is shared between the systems.

A still another conventional technique is for storage of all sets of data blocks in a first storage device (i.e., a memory), and for storage of those sets of data blocks excepting ones that are duplicate to those stored in the first storage device, in a second storage device (i.e., a hard disc), as disclosed in, for example, Japanese Patent Application Publication No. 2007-234026.

Additional conventional techniques are for additional storage of frequently-accessed data blocks into an additional storage device, as disclosed in, for example, Japanese Patent Application Publication No. HEI 7-271523, and for transfer of data into a read-ahead cache, depending on the frequency of accesses to data blocks, as disclosed in, for example, Japanese Patent Application Publication No. HEI 4-259048.

Those techniques are implemented such that one of devices mutually associated does not have the function of monitoring the frequency of accesses to data blocks in another device, or the function of preloading or pre-fetching data blocks from another device.

BRIEF SUMMARY OF THE INVENTION

The above-described conventional de-duplication technique, however, has a drawback that, if a single data block has been lost, then none of many backup images can be recovered which share the same pointer pointing to the lost data block. This implies reliance of many backup images on a single data block.

In addition, the de-duplication technique, because of its intended purpose of data backup, takes a basic configuration of an N (the count of a plurality of sources in which sets of original data have been stored) versus 1 (the count of a single storage device for data backup).

If, however, such a configuration is provided to a system in which a plurality of communication devices are connected via a Wide Area Network to a single data center for collective storage and management of data, then traffic concentration occurs at the single data center.

In addition, the de-duplication technique is implemented by a software-based operation using a CPU (Central Processing Unit) for detection of duplicate data, and production and management of pointers. This implementation can induce an increase in load imposed on the CPU. As a result, traffic concentration at the single data center would create a drop in the total performance of the system.

In addition, a data backup system using an intervening Wide Area Network has an additional need, in preparation for an occurrence of failure in a data center, to backup data in additional data centers or storage devices which are located remotely.

In other words, such a system needs to take a configuration of N (the count of a plurality of sources in which sets of original data have been stored) versus M (the count of a plurality of storage devices for data backup).

In view of the foregoing, it would be desirable to reduce the amount of traffic required for data backup (hereinafter, referred to as "backup traffic") in a network communication environment.

In general, the invention relates to data backup techniques for network-attached storage devices using a de-duplication method.

According to some aspects of the invention, a storage-control communication device for data backup is controlled. The communication device is associated with a storage device, controls the associated storage device, and is communicable with another communication device via a network.

The communication device divides a to-be-stored new file into data blocks, defines and updates a statistical value representative of a history of reference to each data block within previous files, and transmits the statistical value to another communication device.

The communication device, upon reception of the statistical value, selects a preloaded data block, based on the received statistical value, and transmits to another communication device a copying request for making a copy of a real data block identical to the preloaded data block.

In an example, the preloaded data block is considered likely to be needed soon and therefore is loaded into the communication device before the communication device actually receives a new file within which the same data block is referenced.

The communication device, upon reception of the copy of the real data block identical to the preloaded data block, stores the copy as the preloaded data block in the associated storage device.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

General Overview

Figure 1:
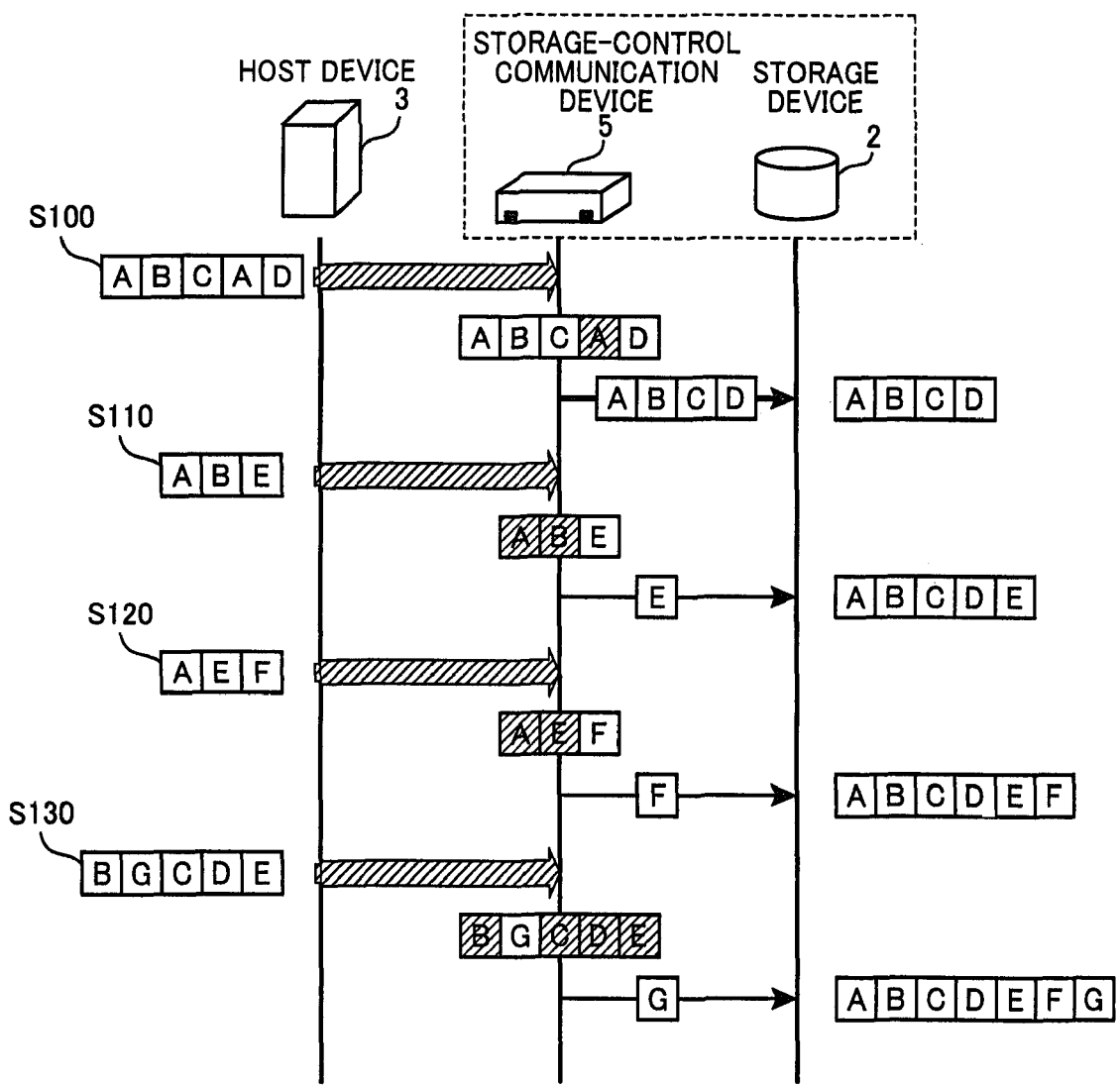
FIG. 1 is a sequence diagram for explanation of a conventional de-duplication technique.

According to a first aspect of the invention, there is provided a method of controlling a storage-control communication device for data backup, which is associated with a storage device, controls the associated storage device, and is communicable with another communication device via a network, the method comprising:

a first step of controlling the communication device for data backup using a de-duplication technique, the first step including:

a sub-step of dividing a new file that is to be stored in the associated storage device, into a plurality of new data blocks; and a sub-step of storing the new data blocks in the associated storage device, such that, when each of at least one of the new data blocks is duplicate to a separate data block, one of the each new data block and the separate data block is selected as a first data block and the other is selected as a second data block, such that the first data block is stored in the associated storage device in the form of a real data block, and such that the second data block is stored in the associated storage device in the form of a pointer pointing to the real data block stored in the associated storage device, not in the form of a real data block, wherein the separate data block is located in a file already stored in the associated storage device and/or the new file;

a second step of controlling the communication device to define and update a statistical value representative of a history of reference to each data block within previous files loaded into the communication device, and to transmit the statistical value to another communication device;

a third step of controlling the communication device, upon reception of the statistical value from another communication device, to select a preloaded data block, based on the received statistical value, and to transmit to another communication device a copying request for making a copy of a real data block stored in a storage device associated with another communication device, wherein the real data block to be copied is identical to the preloaded data block;

a fourth step of controlling the communication device, upon reception of the copying request from another communication device, to make the copy and to transmit the copy to another communication device; and a fifth step of controlling the communication device, upon reception of the copy from another communication device, to store the copy as the preloaded data block in the associated storage device, wherein the first step further includes a sub-step of controlling the communication device, when a new data block to be newly stored in the associated storage device is identical to the preloaded data block already stored in the associated storage device, to convert the preloaded data block into a real data block, and to store the new data block in the associated storage device in the form of a pointer pointing to the real block data stored in the associated storage device, not in the form of a real data block.

In an illustrative implementation of this method, the preloaded data block is selected as a data block which was frequently referenced in preceding files, and which, as a result, is likely or predicted to be referenced within subsequent files.

One of communication devices preloads the thus-selected preloaded data block to another communication device, which allows both the preloaded data block and its original data block to be stored in respective different devices, with the result that identical data blocks are distributed between different devices.

The distribution storage of identical data blocks is advantageous in an attempt to ensure data recovery in the entire system.

According to a second aspect of the invention, there is provided a storage-control communication device for data backup, which is associated with a storage device, controls the associated storage device, and is communicable with another communication device via a network, the communication device comprising:

a de-duplication control section configured to control the communication device for data backup using a de-duplication technique, the de-duplication control section including:

a sub-section configured to divide a new file that is to be stored in the associated storage device, into a plurality of new data blocks; and a sub-section configured to store the new data blocks in the associated storage device, such that, when each of at least one of the new data blocks is duplicate to a separate data block, one of the each new data block and the separate data block is selected as a first data block and the other is selected as a second data block, such that the first data block is stored in the associated storage device in the form of a real data block, and such that the second data block is stored in the associated storage device in the form of a pointer pointing to the real data block stored in the associated storage device, not in the form of a real data block, wherein the separate data block is located in a file already stored in the associated storage device and/or the new file;

a statistical-value update control section configured to define and update a statistical value representative of a history of reference to each data block within previous files loaded into the communication device, and to transmit the statistical value to another communication device;

a preloaded-block selection section configured, upon reception of the statistical value from another communication device, to select a preloaded data block, based on the received statistical value, and to transmit to another communication device a copying request for making a copy of a real data block stored in a storage device associated with another communication device, wherein the real data block to be copied is identical to the preloaded data block;

a preloaded-block transmitting section configured, upon reception of the copying request from another communication device, to make the copy and to transmit the copy to another communication device; and a preloaded-block storing section configured, upon reception of the copy from another communication device, to store the copy as the preloaded data block in the associated storage device, wherein the de-duplication control section further includes a sub-section configured, when a new data block to be newly stored in the associated storage device is identical to the preloaded data block already stored in the associated storage device, to convert the preloaded data block into a real data block, and to store the new data block in the associated storage device in the form of a pointer pointing to the real block data, not in the form of a real data block.

According to a third aspect of the invention, there is provided a computer-readable medium having stored therein a program, when executed by a computer, to implement a method of controlling a storage-control communication device for data backup, which is associated with a storage device, controls the associated storage device, and is communicable with another communication device via a network, the method comprising:

a first step of controlling the communication device for data backup using a de-duplication technique, the first step including:

a sub-step of dividing a new file that is to be stored in the associated storage device, into a plurality of new data blocks; and a sub-step of storing the new data blocks in the associated storage device, such that, when each of at least one of the new data blocks is duplicate to a separate data block, one of the each new data block and the separate data block is selected as a first data block and the other is selected as a second data block, such that the first data block is stored in the associated storage device in the form of a real data block, and such that the second data block is stored in the associated storage device in the form of a pointer pointing to the real data block stored in the associated storage device, not in the form of a real data block, wherein the separate data block is located in a file already stored in the associated storage device and/or the new file;

a second step of controlling the communication device to define and update a statistical value representative of a history of reference to each data block within previous files loaded into the communication device, and to transmit the statistical value to another communication device;

a third step of controlling the communication device, upon reception of the statistical value from another communication device, to select a preloaded data block, based on the received statistical value, and to transmit to another communication device a copying request for making a copy of a real data block stored in a storage device associated with another communication device, wherein the real data block to be copied is identical to the preloaded data block;

a fourth step of controlling the communication device, upon reception of the copying request from another communication device, to make the copy and to transmit the copy to another communication device; and a fifth step of controlling the communication device, upon reception of the copy from another communication device, to store the copy as the preloaded data block in the associated storage device, wherein the first step further includes a sub-step of controlling the communication device, when a new data block to be newly stored in the associated storage device is identical to the preloaded data block already stored in the associated storage device, to convert the preloaded data block into a real data block, and to store the new data block in the associated storage device in the form of a pointer pointing to the real data block stored in the associated storage device, not in the form of a real data block.

The term "program" may be interpreted as, for example, a combination of a set of instructions implemented by a computer to perform the function(s) of the program, and associated files, data or the like to be processed according to the instructions.

The "computer-readable medium" may be in the form of, for example, a magnetic recording medium such as a flexible disc, an optical recording medium such as a CD or a CD-ROM, an optical-magnetic recording medium such as an MO, or an un-removable storage such as a ROM.

Illustrative Embodiments

According to the invention, the following modes are provided as illustrative embodiments of the invention.

According to a first mode of the invention, there is provided the method according to the first aspect of the invention, wherein each statistical value associated with each data block includes at least one of a last referenced time of each data block, a count of total times that each preloaded data block was referenced, and a frequency of events that each data block is referenced during a given length of time.

According to a second mode of the invention, there is provided the method according to the first aspect or the first mode of the invention, wherein the third step comprises a sub-step of controlling the communication device to select each of at least one of the data blocks which has the statistical value that has met a predetermined condition, as the preloaded data block.

According to a third mode of the invention, there is provided the method according to any one of the first aspect, the first and second modes of the invention, further comprising a sixth step of controlling the communication device, when the real data block originating from the preloaded data block is lost, to recover the lost real data block, wherein the sixth step includes:

a sub-step of controlling the communication device to transmit a recovery request for recovering the lost real data block, to another communication device that transmitted the preloaded data block to the communication device; and a sub-step of controlling the communication device, upon reception of the recovery request from another communication device, to retrieve the real data block from the associated storage device and transmit the real data block to another communication device.

According to a fourth mode of the invention, there is provided the method according to any one of the first aspect, the first through third modes of the invention, further comprising a seventh step of controlling the communication device to delete partially a plurality of preloaded data blocks that have been stored in the associated storage device, wherein the seventh step includes a sub-step of controlling the communication device to delete at least one of the plurality of preloaded data blocks which has met a predetermined deletion condition, to thereby prevent a maximum amount of preloaded data blocks stored in the associated storage device, from exceeding a set value.

According to a fifth mode of the invention, there is provided the method according to the fourth mode of the invention, wherein the deletion condition relates to at least one of a count of total times that each preloaded data block was referenced, a last referenced time of each preloaded data block, and a frequency of events that each preloaded data block was referenced during a given length of time.

According to a sixth mode of the invention, there is provided the method according to any one of the first aspect and the first through fifth modes of the invention, wherein the communication device is in the form of a network switch device, to which the associated storage device and a host device are attached.

According to a seventh mode of the invention, there is provided the storage-control communication device according to the second aspect of the invention, wherein each statistical value associated with each data block includes at least one of a last referenced time of each data block, and a frequency of events that each data block is referenced during a given length of time.

According to an eighth mode of the invention, there is provided the storage-control communication device according to any one of the second aspect and the seventh mode of the invention, wherein the preloaded-block selection section comprises a sub-section configured to select each of at least one of the data blocks which has the statistical value that has met a predetermined condition, as the preloaded data block.

According to a ninth mode of the invention, there is provided the storage-control communication device according to any one of the second aspect, the seventh and eighth modes of the invention, further comprising a recovery section configured, when the real data block originating from the preloaded data block is lost, to recover the lost real data block, wherein the recovery section includes:

a sub-section configured to transmit a recovery request for recovering the lost real data block, to another communication device that transmitted the preloaded data block to the communication device; and a sub-section configured, upon reception of the recovery request from another communication device, to retrieve the real data block from the associated storage device and transmit the retrieved real data block to another communication device.

According to a tenth mode of the invention, there is provided the storage-control communication device according to any one of the second aspect and the seventh through ninth modes of the invention, further comprising a deletion section configured to delete partially a plurality of preloaded data blocks that have been stored in the associated storage device, wherein the deletion section includes a sub-section configured to delete at least one of the plurality of preloaded data blocks which has met a predetermined deletion condition, to thereby prevent a maximum amount of preloaded data blocks stored in the associated storage device, from exceeding a set value.

According to an eleventh mode of the invention, there is provided the storage-control communication device according to the tenth mode of the invention, wherein the deletion condition relates to at least one of a count of total times that each preloaded data block was referenced, a last referenced time of each preloaded data block, a count of total times that each preloaded data block was referenced, and a frequency of events that each preloaded data block was referenced during a given length of time.

According to a twelfth mode of the invention, there is provided the storage-control communication device according to any one of the second aspect and the seventh through eleventh modes of the invention, wherein the communication device is in the form of a network switch device, to which the associated storage device and a host device are attached.

According to a thirteenth mode of the invention, there is provided the method according to any one of the first aspect and the first through sixth modes of the invention, wherein the communication device and another communication device are communicable with a data center via the network, the data center receives backups from the communication device and another communication device via the network, and stores the received backups in the data center, to thereby act as a common site for data storage, and the first step further comprises a sub-step of transmitting a copy of the real data block to the data center for backup, without transmitting a copy of the preloaded data block to the data center.

This method makes it easier to reduce the number of duplicate data blocks stored in the data center, and to eliminate or reduce concentration of backup traffic at the data center.

According to a fourteenth mode of the invention, there is provided the method according to the thirteenth mode of the invention, wherein the first step further comprises a sub-step of controlling the communication device such that, if a new data block which has just entered the communication device, is not duplicate to any other already stored data block in associated storage device, then the new data block is transmitted to the data center for data backup, and if, however, the new data block is duplicate, then the new data block is not transmitted to the data center.

This method makes it easier to reduce the number of duplicate data blocks stored in the data center, and to reduce or eliminate concentration of backup traffic at the data center.

Several presently preferred embodiments of the invention will be described in more detail by reference to the drawings in which like numerals are used to indicate like elements throughout.

Figure 2:
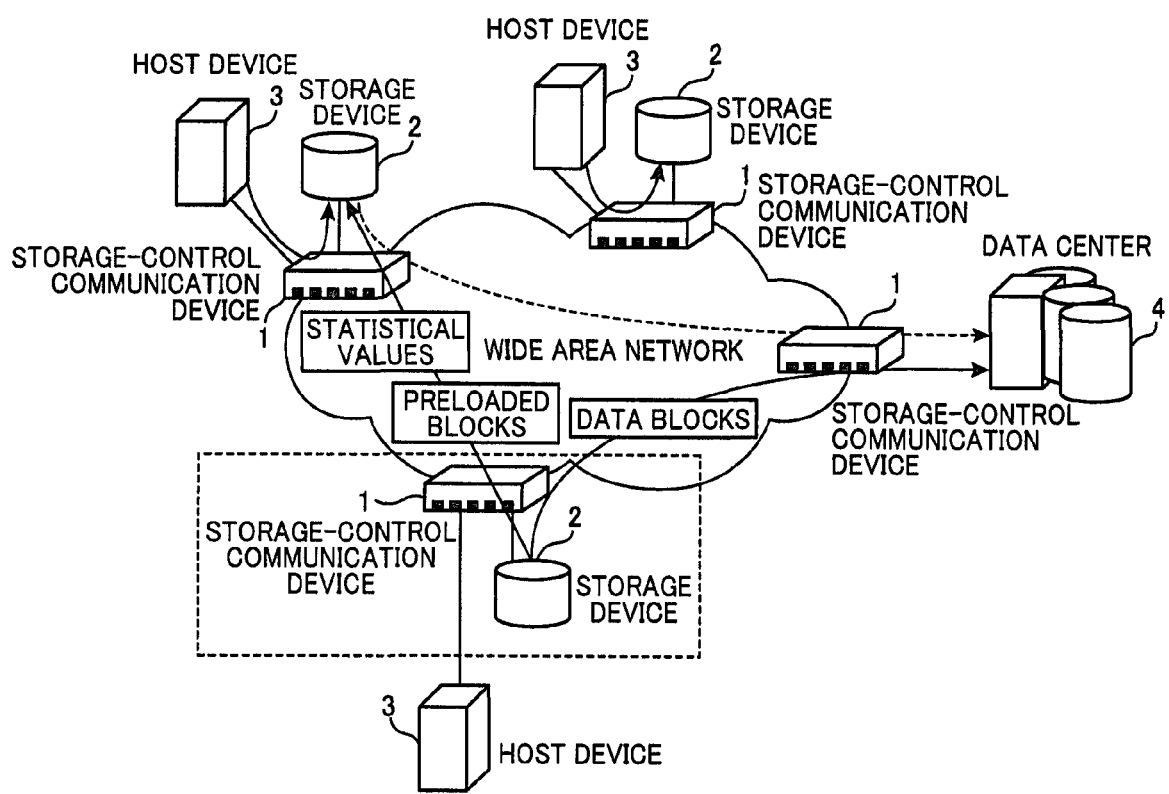
FIG. 2 is a view illustrative of the configuration of a system constructed according to an illustrative embodiment of the present invention.

Referring now to FIG. 2, the configuration of a system is illustrated which is constructed according to an embodiment of the present invention. This system operates by implementing a method according to an illustrative embodiment of the present invention.

As illustrated in FIG. 2, this system has a plurality of storage-control communication devices 1 which are networked together via a WAN (Wide Area Network) (e.g., the Internet, a VPN). When the WAN is in the form of the VPN, each communication device 1 may be in the form of a so-called edge device.

As illustrated in FIG. 2, those communication devices 1 include a first communication device 1 and a second communication device 1, both of which are identical in configuration to each other, and other communication devices (not shown). These first and second communication devices 1 are representative ones of all the communication devices 1, for the convenience of description.

As illustrated in FIG. 2, there is connected with each communication device 1, a host device 3 (e.g., a personal computer) and a storage device 2 (e.g., a hard disc drive). Each communication device 1 is configured to provide the function of communicating with other communication devices 1 and the function of data input/output with regard to the storage device 2.

Each communication device 1 may be constructed integrally with the storage device 2. Each communication device 1 may be in the form of, for example, a network switch device.

Host devices 3 for those communication devices 1 are identical in construction to each other, and likewise, storage devices 2 for these communication devices 1 are identical in construction to each other.

Each storage device 2 is used for storage of real data blocks and pointers pointing to already existing data blocks in each storage device 2, as described in more detailed later, with reference to FIG. 5.

As illustrated in FIG. 2, a data center 4 is provided for data backup in connection with the communication devices 1 via the WAN. The data center 4 is, in common to the communication devices 1, for collective storage and management of data.

Each communication device 1 operates to store data into one of the storage devices 2 which is associated with the each communication device 1, using a de-duplication technique.

Each communication device 1 operates, owing to the use of the de-duplication technique, to store a new data block, such that, if the new data block is duplicate to an already existing data block stored in the associated storage device 2, the new data block is not stored in the form of a real block data, and instead, in the form of a pointer pointing to the already existing data block. The later access allows the already existing data block to be referenced for later formation of a data file.

Additionally, each communication device 1 operates to store a new data block, such that, if the new data block is not duplicate to an already existing data block stored in the associated storage device 2, the new data block is stored in the form of a real block data, and operates to transmit a backup (i.e., a duplicate copy) of the real data block to the data center 4 for backup.

In connection with the above-described operation, each communication device 1 operates to define and update a statistical value representative of a history of reference to each data block. Each statistical value includes the count of times that each data block was referenced. Alternatively or additionally, each statistical value may include a last referenced time of each data block.

Each communication device 1 is configured to select at least one of data blocks which was referenced frequently, each as a preloaded data block, and to transmit the selected preloaded block to another communication device 1 via the WAN.

The preloaded data block is considered likely to be needed soon and therefore is loaded into each communication device 1 before each communication device 1 actually receives a new file within which the same data block is referenced.

Each communication device 1, upon selection of a preloaded data block, operates to transmit a backup of the preloaded data block to the data center 4 as well as to another communication device 1.

Figure 3:
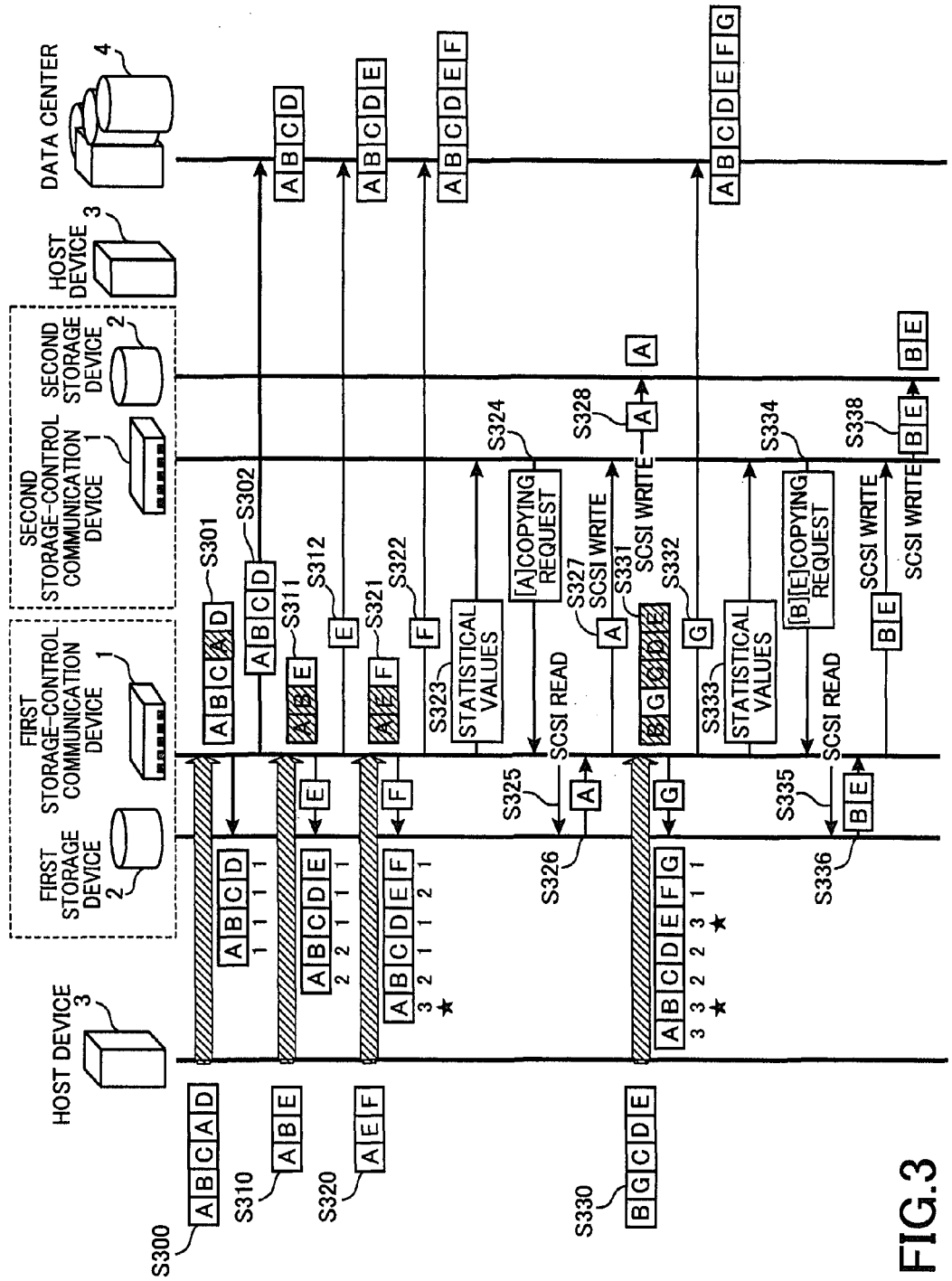
FIG. 3 is a first sequence diagram for explanation of operations of the system depicted in FIG. 2.

Referring next to FIG. 3, a first sequence diagram illustrates a sequence in which the system constructed according to this preferred embodiment of the present invention operates.

Step S300

One of the host devices 3 which is for the first communication device 1 and the first storage device 2 (shown in FIG. 3 on the left-hand side), sends a to-be-stored first file (which has been divided or partitioned into data blocks [A], [B], [C], [A] and [D]), to the first communication device 1.

Step S301

The first communication device 1 recognizes that two identical data blocks [A] and [A] (i.e., first and second data blocks [A] and [A]) coexist within the first file, and then the first communication device 1 sends data blocks [A], [B], [C] and [D] to the first storage device 2 for storage.

The first communication device 1 stores the second data block [A] in the first storage device 2, in the form of a pointer, not a real data block. The pointer points to an address at which the first data block [A] has been stored in the first storage device 2 in the form of a real data block.

The first communication device 1 defines statistical values which include the counts of reference to data blocks [A], [B], [C] and [D] within the first file (hereinafter, referred to as "reference counts"). If each data block is referenced in a target file, then the corresponding reference count is incremented by only one, irrespective of the number of times that each reference was referenced within the same target file.

Therefore, for the first file, the reference count for data block [A] is incremented to "1," the reference count for data block [B] is incremented to "1," the reference count for data block [C] is incremented to "1," and the reference count for data block [D] is incremented to "1."

It is added that a threshold value (or a "set value") is used for determining whether or not each data block was frequently referenced so far, and that the threshold value has been set to "3" in an example.

Step S302

The first communication device 1 transmits to the data center 4, duplicate copies of data blocks [A], [B], [C] and [D] which have just been stored in the first storage device 2. This allows the first file to be backed up.

Step S310

The same host devices 3 (shown in FIG. 3 on the left-hand side) sends a to-be-stored second file (which has been divided or partitioned into data blocks [A], [B] and [E]), to the first communication device 1.

Step S311

The first communication device 1 recognizes that data blocks [A] and [B] have already been stored in the first storage device 2, and then the first communication device 1 sends only data block [E] to the first storage device 2 for storage.

The first communication device 1 stores data blocks [A] and [B] that were referenced within the second file, in the first storage device 2, each in the form of a pointer, not a real data block. Each pointer points to an address at which each of data blocks [A] and [B] has been stored in the first storage device 2 in the form of a real data block.

The first communication device 1 updates the statistical values such that the reference count for data block [A] is incremented by one to "2," and the reference count for data block [B] is incremented by one to "2."

Step S312

The first communication device 1 transmits to the data center 4, a duplicate copy of data block [E] which has just been stored in the first storage device 2. This allows the second file to be backed up.

Step S320

The same host devices 3 (shown in FIG. 3 on the left-hand side) sends a to-be-stored third file (which has been divided into data blocks [A], [E] and [F]), to the first communication device 1.

Step S321

The first communication device 1 recognizes that data blocks [A] and [E] have already been stored in the first storage device 2, and then the first communication device 1 sends only data block [F] to the first storage device 2 for storage.

The first communication device 1 stores data blocks [A] and [E] that were referenced within the third file, in the first storage device 2, each in the form of a pointer, not a real data block. Each pointer points to an address at which each of data blocks [A] and [E] has been stored in the first storage device 2 in the form of a real data block.

The first communication device 1 updates the statistical values such that the reference count for data block [A] is incremented by one to "3," and the reference count for data block [E] is incremented by one to "2."

Step S322

The first communication device 1 transmits to the data center 4, a duplicate copy of data block [F] which has just been stored in the first storage device 2. This allows the third file to be backed up.

Step S323

The first communication device 1 transmits via the network to the second communication device 1, the statistical values including the reference counts for data blocks.

The first communication device 1, when there are a plurality of counterpart communication devices 1 which are identical in construction to each other, transmits the statistical values to all other communication devices 1 including the second communication device 1. The first communication device 1 may be configured to transmit the statistical values, at fixed intervals, or each time that data is updated.

Step S324

The second communication device 1 selects at least one of the received statistical values which reaches or exceeds the aforementioned threshold value (i.e., "3"), each as a preloaded or pre-fetched data block.

In this case illustrated in FIG. 3, the second communication device 1 selects data block [A] as preloaded data block [A] because its reference count is "3." For example, data block [A] is flagged to indicate that it is handled as preloaded data block [A].

The second communication device 1 confirms that data block [A] has not yet stored in the second storage device 2. In response, the second communication device 1 transmits a copy request for making a copy of data block [A], to the first communication device 1.

Step S325

The first communication device 1, upon reception of the copy request, transmits to the first storage device 2 a read request for reading data block [A], using such as a SCSI Read command.

Step S326

In response, the first storage device 2 sends data block [A] to the first communication device 1.

Step S327

In response, the first communication device 1 transmits data block [A] (i.e., the preloaded data block) to the second communication device 1 via the network, using such as a SCSI Write command.

Step S328

The second communication device 1 sends the received preloaded data block [A] to the second storage device 1 for storage. The second communication device 1 does not transmit to the data center 4, a duplicate copy of the preloaded data block [A] which has just been stored in the second storage device 2.

The preloaded data block [A] has already been backed up in the data center 4 as a result of the previous backup operation by the first communication device 1, to thereby remove a need for the second communication device 1 to back up the same data again in the data center 4.

Step S330

The same host devices 3 (shown in FIG. 3 on the left-hand side) sends a to-be-stored fourth file (which has been divided into data blocks [B], [G], [C], [D] and [E]), to the first communication device 1.

Step S331

The first communication device 1 recognizes that data blocks [B], [C], [D] and [E] have already been stored in the first storage device 2, and then the first communication device 1 sends only data block [G] to the first storage device 2 for storage.

The first communication device 1 stores data blocks [B], [C], [D] and [E] that were referenced within the fourth file, in the first storage device 2, each in the form of a pointer, not a real data block. Each pointer points to an address at which each of data blocks [B], [C], [D] and [E] has been stored in the first storage device 2 in the form of a real data block.

The first communication device 1 updates the statistical values such that the reference count for data block [B] is incremented by one to "3," the reference count for data block [C] is incremented by one to "2," the reference count for data block [D] is incremented by one to "2," and the reference count for data block [E] is incremented by one to "3."

Step S332

The first communication device 1 transmits to the data center 4, a duplicate copy of data block [G] which has just been stored in the first storage device 2. This allows the fourth file to be backed up.

Step S333

The first communication device 1 transmits via the network to the second communication device 1, the statistical values including the reference counts for the respective data blocks.

Step S334

The second communication device 1 selects at least one of the received statistical values which has reached or exceeded the aforementioned threshold value (i.e., "3"), each as a preloaded or pre-fetched data block. In this case, the second communication device 1 selects data blocks [B] and [E] because their reference counts are "3."

The second communication device 1 confirms that data blocks [B] and [E] have not yet stored in the second storage device 2. In response, the second communication device 1 transmits a copy request for making a copy of each of data blocks [B] and [E], to the first communication device 1.

Step S335

The first communication device 1, upon reception of the copy request, transmits a read request for reading data blocks [B] and [E], to the first storage device 2.

Step S336

In response, the first storage device 2 sends data blocks [B] and [E] to the first communication device 1.

Step S337

In response, the first communication device 1 transmits data blocks [B] and [E] (i.e., the preloaded data blocks) to the second communication device 1 via the network.

Step S338

The second communication device 1 sends the received preloaded data blocks to the second storage device 1 for storage. The second communication device 1 does not transmit to the data center 4, duplicate copies of the preloaded data blocks [B] and [E] which have just been stored in the second storage device 2.

The preloaded data blocks [B] and [E] have already been backed up in the data center 4 as a result of the previous backup operation by the first communication device 1, to thereby remove a need for the second communication device 1 to back up the same data again in the data center 4.

Figure 4:
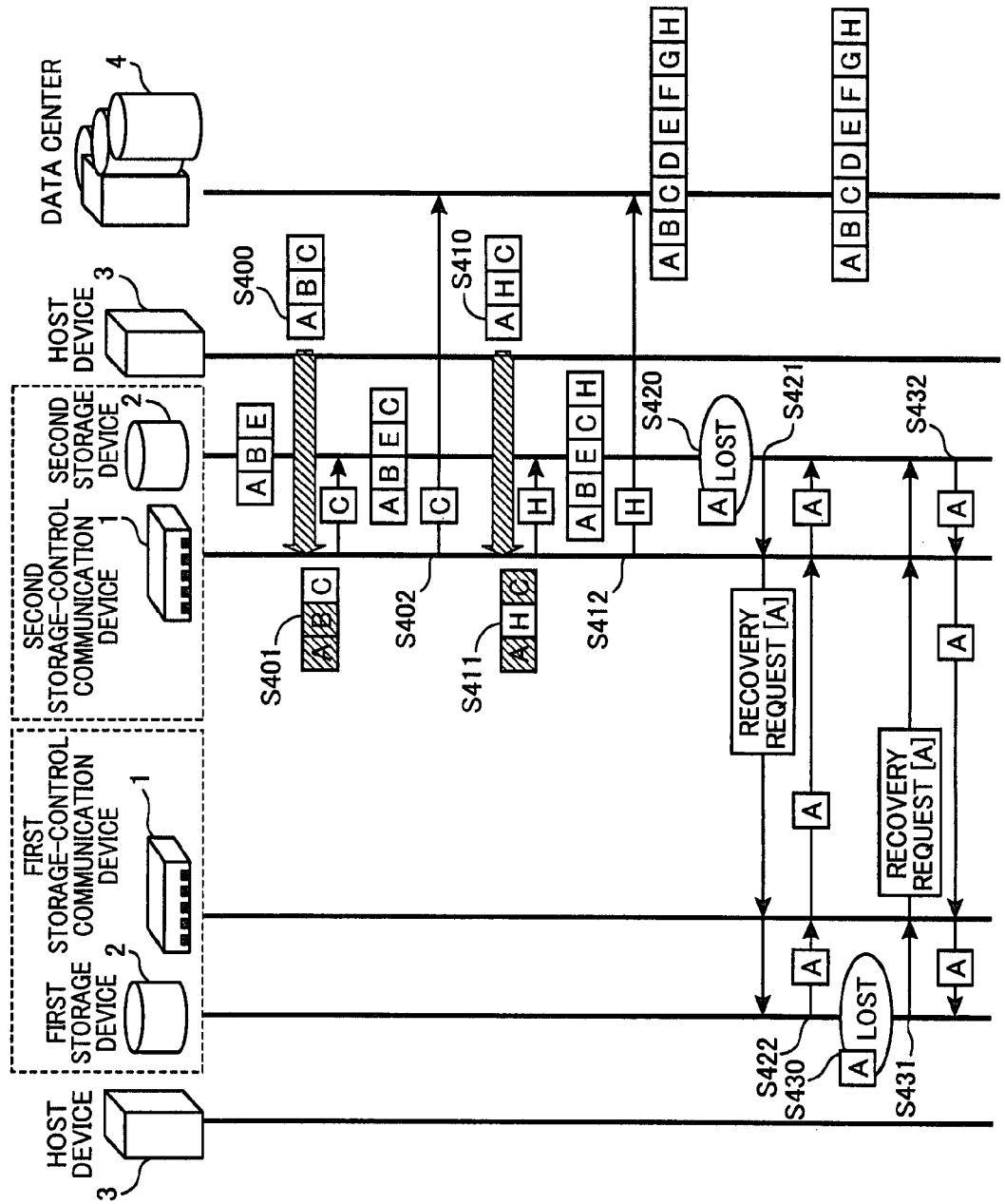
FIG. 4 is a second sequence diagram for explanation of operations of the system depicted in FIG. 2.

Referring next to FIG. 4, a second sequence diagram illustrates the additional sequence in which the system constructed according to this preferred embodiment of the present invention operates.

Referring back to FIG. 3, the sequence illustrated in FIG. 3 ends up with the preloaded data blocks [A], [B] and [E] having been stored in the second storage device 2, which is associated with the host device 3 (illustrated in FIG. 3 on the right-hand side).

Step S400

Referring back to FIG. 4, the host device 3 (illustrated in FIG. 4 on the right-hand side) sends a fifth file (which has been divided into data blocks [A], [B] and [C]) to the second communication device 1.

Step S401

In response, the second communication device 1 recognizes that data blocks [A] and [B] have already been stored in the second storage device 2, as preloaded data blocks [A] and [B], and then, the second communication device 1 sends only data block [C] to the second data storage 2 for storage.

The second communication device 1, thereafter, handles those preloaded data blocks [A] and [B] as real data blocks [A] and [B]. For example, data blocks [A] and [B] are unflagged to indicate that they are handled not as preloaded data blocks [A] and [B] but as real data blocks [A] and [B].

The second communication device 1 stores data blocks [A] and [B] that are referenced within the fifth file, in the second storage device 2, in the form of pointers pointing to addresses at which real data blocks [A] and [B] have already stored in the second storage device 2.

Step S402

The second communication device 1 transmits a duplicate copy of data block [C] that has just been stored in the second storage device 2, to the data center 4. The second communication device 1, however, does not transmit duplicate copies of data blocks [A] and [B] to the data center 4.

Step S410

The right-hand host device 3 sends a sixth file (which has been divided into data blocks [A], [H] and [C]), to the second communication device 1.

Step S411

In response, the second communication device 1 recognizes that data blocks [A] and [C] have already been stored in the second storage device 2, and then, the second communication device 1 sends only data block [H] to the second data storage 2 for storage.

The second communication device 1 stores data blocks [A] and [C] that are referenced within the sixth file, in the second storage device 2, in the form of pointers pointing to addresses at which real data blocks [A] and [C] have already stored in the second storage device 2.

Step S412

The second communication device 1 transmits to the data center 4, a duplicate copy of data block [H] that has just been stored in the second storage device 2. The second communication device 1, however, does not transmit duplicate copies of data blocks [A] and [C] to the data center 4.

Referring to FIG. 4, the sequence will be described in which, in the event that an arbitrary data block has been lost, each communication device 1 operates for recovery or restoration of the lost data block.

Step 420

A case is considered where data block [A] has been lost in the second storage device 2.

In this case, data block [A] is in the form of a real data block into which the second communication device 1 has converted the preloaded data block [A]. Beforehand, the second communication device 1 received the preloaded data block [A] from another communication device 1, which is a source of the preloaded data block [A]. The second communication device 1 has stored therein the address of the source in the network.

Step S421

Then, the second communication device 1 transmits a recovery request for recovery of the lost data block [A], via the network, to the first communication device 1, which is the source of data block [A].

In response, the first communication device 1 sends a read request for reading data block [A] from the first storage device 2.

Step S422

In response, the first storage device 2 sends data block [A] to the first communication device 1.

In response, the first communication device 1 transmits data block [A] to the second communication device 1 via the network. This results in successful recovery of the lost data block [A] in the second storage device 1.

Step S430

Another case is considered where data block [A] has been lost in the first storage device 2.

In this case, data block [A] is the preloaded data block [A] which the first communication device 1 has transmitted to the second communication device 1, which is a destination of the preloaded data block [A]. The first communication device 1 has stored therein the address of the destination in the network.

Step S431

Then, the first communication device 1 transmits a recovery request for recovery of the lost data block [A], via the network, to the second communication device 1, which is the destination of data block [A].

In response, the second communication device 1 sends a read request for reading data block [A] from the second storage device 2.

Step S432

In response, the second storage device 2 sends data block [A] to the second communication device 1.

In response, the second communication device 1 transmits data block [A] to the first communication device 1 via the network. This results in successful recovery of the lost data block [A] in the first storage device 1.

Figure 5:
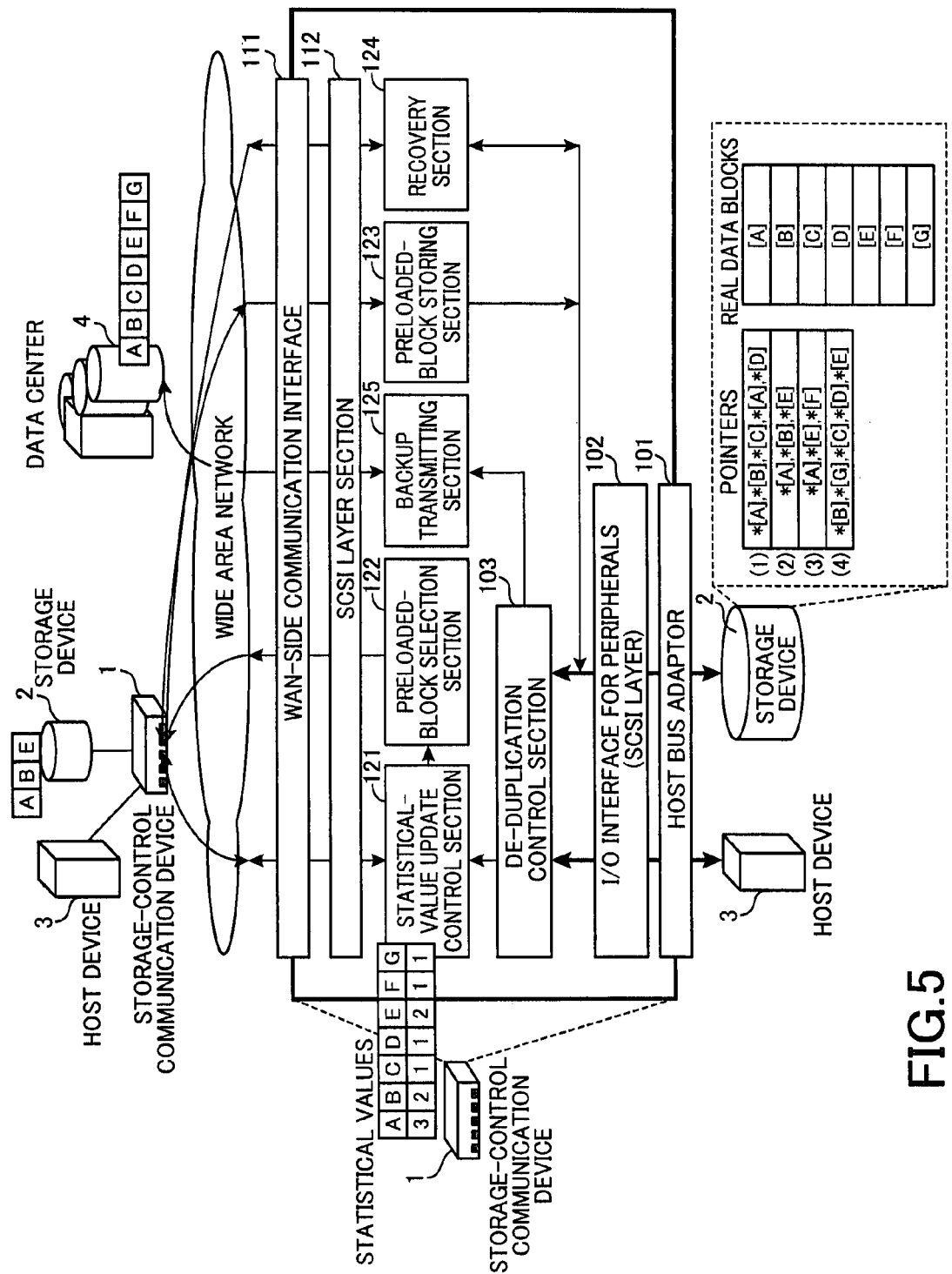
FIG. 5 is a functional block diagram illustrative of a representative one of storage-control communication devices depicted in FIGS. 2-4.

Referring next to FIG. 5, there is illustrated in more detailed functional block diagram, the configuration of each communication device 1 constructed according to the illustrative embodiment of the present invention.

As illustrated in FIG. 5, each communication device 1 is configured to include a host bus adaptor 101, an I/O interface 102 for peripherals, and a de-duplication control section 103. Each communication device 1 is also configured to further include a WAN-side communication interface 111 and a SCSI layer section 112.

Each communication device 1 is still also configured to still further include a statistical-value update control section 121, a preloaded-block selection section 122, a preloaded-block storing section 123, a recovery section 124 and a backup transmitting section 125.

As is evident from the foregoing, each communication device 1 is configured to provide a plurality of functions for achieving the intended purposes as described above. Those functions, excepting those corresponding to the host bus adaptor 101 and the WAN-side communication interface 111, are provided as a result of execution of a particular program by a computer which has been mounted in each communication device 1.

As is well-known, the computer is configured to include a processor, memories and buses, and the memories are used for storage of the particular program and the processor is used for execution of the particular program.

The host bus adaptor 101, for each communication device 1, is used to interconnect the corresponding one of the storage devices 2 and the corresponding one of the host devices 3, via a parallel bus.

The I/O interface 102, in the form of, for example, a SCSI layer section, is used to transmit data blocks to and receive data blocks from the corresponding storage device 2 and the corresponding host device 3.

The interface between the side of each communication device 1 and the side of the corresponding storage device 2 and the corresponding host device 3 is not limited to a type of interface employing both a host bus adaptor and a SCSI protocol, and it may be, alternatively, an Ethernet® interface using IP, or otherwise, a fiber channel interface.

The WAN-side communication interface 111, in the form of, for example, an Ethernet interface, is used to connect each communication device 1 to the WAN. In an example where the WAN is in the form of the Internet, the WAN-side communication interface 111 is provided as a network transport protocol. Alternatively, the WAN-side communication interface 111 may be of a type employing a fiber channel protocol.

The SCSI layer section 112 for each communication device 1 is used to transmit/receive SCSI commands or responses, to and from the counterpart communication devices 1. Those SCSI commands or responses, for enabling transmission and reception, are capsulated with IP packets.

The de-duplication control section 103 is configured to store a file which has been received from the corresponding host device 3, into the corresponding storage device 2, using a de-duplication technique.

More specifically, the de-duplication control section 103 includes a first sub-section configured to divide or partition a new file that is to be stored in the associated storage device 2, into a plurality of new data blocks.

The de-duplication control section 103 further includes a second sub-section configured, when each of at least one of the new data blocks is duplicate to a separate data block, to select one of the each new data block and the separate data block as a first data block, and the other as a second data block. The separate data block is located in a file already stored in the associated storage device 2 and/or the new file.

The first sub-section stores the first data block in the associated storage device 2 in the form of a real data block. On the other hand, the first sub-section stores the second data block in the associated storage device 2 in the form of a pointer pointing to the real data block stored in the associated storage device 2, not in the form of a real data block.

The de-duplication control section 103 further includes a deletion section configured to delete partially a plurality of preloaded data blocks that have been stored in the associated storage device 2.

More specifically, the deletion section includes a sub-section configured to delete at least one of the plurality of preloaded data blocks which has met a predetermined deletion condition, to thereby prevent a maximum amount of preloaded data blocks stored in the associated storage device 2, from exceeding a set value, that is, a predetermined storage capacity of the associated storage device 2.

The deletion condition relates to at least one of the count of total times that each preloaded data block was referenced within previous files, a last referenced time of each preloaded data block, and the frequency of events that each preloaded data block was referenced within previous files during a given length of time.

Alternatively or additionally, the deletion condition may relate to a received time of each preloaded data block from another communication device 1.

In this example, the de-duplication control section 103 is configured to delete already existing preloaded-data-blocks in the order in which they were received from another communication device 1 (i.e., the deletion order is from oldest to newest).

The de-duplication control section 103 further includes a sub-section configured, when a new data block to be newly stored in the associated storage device 2 is identical to the preloaded data block already stored in the associated storage device 2, to convert the preloaded data block into a real data block, and to store the new data block in the associated storage device 2 in the form of a pointer pointing to the real block data, not in the form of a real data block.

For achieving the conversion, the de-duplication control section 103 may be configured to move the preloaded data block from the original address area into an address area for a real data block. Alternatively, the de-duplication control section 103 may be configured to merely unflag the preloaded data block (i.e., reset a preload flag) to indicate that the preloaded data block is handled as a real data block this time.

It is added that, because the preloaded data block has already been backed up in the data center 4 as a result of the previous backup operation by another communication device 1, there is no need for the communication device 1 to back up the same data again in the data center 4.

The statistical-value update control section 121 is configured to define and update the statistical value, which is representative of a history of reference to each data block within previous files loaded into the communication device 1.

In an example, each statistical value for each one of already existing data blocks includes the count of total times that each preloaded data block was referenced within previous files (i.e., the aforementioned reference count).

The communication device 1 transmits the statistical values to another communication device 1.

Likewise, the communication device 1 receives such statistical values from another communication device 1. The communication device 1, upon reception, sends the statistical values to the preloaded-block selection section 122.

The preloaded-block selection section 122 is configured, upon reception of the statistical values from another communication device 1, to select at least one preloaded data block, based on the received statistical values.

The preloaded-block selection section 122 determines whether or not each statistical value has met a predetermined condition, on a block-by-block basis. In an example, the preloaded-block selection section 122 determines whether or not each reference count has reached or exceeded the threshold value or set value, and each corresponding data block has not yet been stored in the associated storage device 2.

If the preloaded-block selection section 122 has determined that one of the reference counts has reached or exceeded the threshold value and its corresponding data block has not yet been stored in the associated storage device 2, then the preloaded-block selection section 122 selects the corresponding data block as a preloaded data block.

The preloaded-block selection section 122, upon selection of a preloaded data block, transmits to another communication device 1 a copying request for making a copy of a real data block stored in the storage device 2 that is associated with another communication device 1. The real data block to be copied is identical to the preloaded data block.

The preloaded-block selection section 122 is configured to include a preloaded-block transmitting section configured, upon reception of the copying request from another communication device 1, to make the copy and to transmit the copy to another communication device 1.

The preloaded-block storing section 123 is configured, upon reception of the copy from another communication device 1, to temporarily store the copy as the preloaded data block in the associated storage device 2.

The recovery section 124 is configured, when the real data block originating from the preloaded data block is lost, to recover the lost real data block.

More specifically, the recovery section 124 includes a sub-section configured to transmit a recovery request for recovering the lost real data block, to another communication device 1 that transmitted the preloaded data block to the communication device 1.

The recovery section 124 further includes a sub-section configured, upon reception of the recovery request from another communication device 1, to retrieve the real data block from the associated storage device 2 and transmit the retrieved real data block to another communication device 1. This results in successful recovery of the lost data block.

The backup transmitting section 125 is configured to transmit to the data center 4, data blocks which have been stored in the associated storage device 2 by the de-duplication control section 103, excepting preloaded data blocks.

In this illustrative embodiment, a preloaded data block is selected as a data block which was frequently referenced in preceding files, and which, as a result, is likely or predicted to be referenced in subsequent files.

Each communication device 1 preloads the thus-selected preloaded data block to another communication device 1, which allows both the preloaded data block and its original data block to be stored in the respective different storage devices 2, with the result that identical data blocks are distributed between the different storage devices 2.

The distribution storage of identical data blocks is advantageous in an attempt to ensure data recovery in the entire system.

Further, in this illustrative embodiment, the number of duplicate data blocks stored in the data center 4 can be reduced more easily, and also concentration of backup traffic at the data center 4 can be eliminated or reduced more easily.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of controlling a plurality of storage-control communication devices for data backup, which are associated with a plurality of storage devices, control the plurality of storage devices, and each of which is communicable with another storage-control communication device via a network, the method comprising:

a first step of controlling the plurality of storage-control communication devices for data backup using a de-duplication technique, the first step including:

a sub-step of dividing a new file that is to be stored in a first storage device associated with a first storage-control communication device, into a plurality of new data blocks; and a sub-step of storing the new data blocks in the first storage device, such that, when each of at least one of the new data blocks is duplicate to a separate data block, one of the each new data block and the separate data block is selected as a first data block and the other is selected as a second data block, such that the first data block is stored in the first storage device in the form of a real data block, and such that the second data block is stored in the first storage device in the form of a pointer pointing to the real data block stored in the first storage device, not in the form of a real data block, wherein the separate data block is located in a file already stored in the first storage device or another storage device associated with the first storage-control communication device or the new file in the first storage device;

a second step of controlling the plurality of storage-control communication devices to define and update a statistical value representative of a history of reference to each data block within previous files loaded into the first storage-control communication device, and to transmit the statistical value to a second storage-control communication device;

a third step of controlling the plurality of storage-control communication devices, upon reception of the statistical value from the first storage-control communication device, to select a preloaded data block, based on the received statistical value, and to transmit from the second storage-control communication device to the first storage-control communication device a copying request for making a copy of a real data block stored in the first storage device associated with first storage-control communication device, wherein the real data block to be copied is identical to the preloaded data block;

a fourth step of controlling the plurality of storage-control communication devices, upon reception of the copying request from the second storage-control communication device, to make the copy and to transmit the copy to the second storage-control communication device; and a fifth step of controlling the plurality of storage-control communication devices, upon reception of the copy from the first storage-control communication device, to store the copy as the preloaded data block in a second storage device associated with the second storage-control communication device, wherein the first step further includes a sub-step of controlling the plurality of storage-control the communication devices, when a new data block to be newly stored in the associated one of the plurality of storage devices is identical to the preloaded data block already stored in one of the plurality of storage devices, to convert the preloaded data block into a real data block, and to store the new data block in one of the plurality of storage devices in the form of a pointer pointing to the real block data stored in one of the plurality of storage devices, not in the form of a real data block, and wherein the first and second storage-control communication devices are interchangeable and the first and second storage devices are interchangeable.

2. The method according to claim 1, wherein each statistical value associated with each data block includes at least one of a last referenced time of each data block, a count of total times that each preloaded data block was referenced, and a frequency of events that each data block is referenced during a given length of time.

3. The method according to claim 1, wherein the third step comprises a sub-step of controlling the plurality of storage-control communication devices to select each of at least one of the data blocks which has the statistical value that has met a predetermined condition, as the preloaded data block.

4. The method according to claim 1, further comprising a sixth step of controlling the plurality of communication devices, when the real data block originating from the preloaded data block is lost, to recover the lost real data block, wherein the sixth step includes:

a sub-step of controlling the second storage-control communication device to transmit a recovery request for recovering the lost real data block, to the first storage-control communication device that transmitted the preloaded data block to the second storage-control communication device; and a sub-step of controlling the first storage-control communication device, upon reception of the recovery request from the second storage-control communication device, to retrieve the real data block from the first storage device and transmit the real data block to the second storage-control communication device.

5. The method according to claim 1, further comprising a seventh step of controlling the plurality of storage-control communication devices to delete partially a plurality of preloaded data blocks that have been stored in the first storage device, wherein the seventh step includes a sub-step of controlling the first storage-control communication device to delete at least one of the plurality of preloaded data blocks which has met a predetermined deletion condition, to thereby prevent a maximum amount of preloaded data blocks stored in the first storage device, from exceeding a set value.

6. The method according to claim 5, wherein the deletion condition relates to at least one of a count of total times that each preloaded data block was referenced, a last referenced time of each preloaded data block, and a frequency of events that each preloaded data block was referenced during a given length of time.

7. The method according to claim 1, wherein each of the plurality of storage-control communication devices is in the form of a network switch device, to which the plurality of storage devices and a host device are attached.

8. A first storage-control communication device for data backup, which is associated with a plurality of storage devices, controls the first storage device, and is communicable with a second storage-control communication device via a network, the first storage-control communication device comprising:

a de-duplication control section configured to control the first storage-control communication device for data backup using a de-duplication technique, the de-duplication control section including:

a sub-section configured to divide a new file that is to be stored in a first storage device associated with the first storage-control communication device, into a plurality of new data blocks; and a sub-section configured to store the new data blocks in the first storage device, such that, when each of at least one of the new data blocks is duplicate to a separate data block, one of the each new data block and the separate data block is selected as a first data block and the other is selected as a second data block, such that the first data block is stored in the first storage device in the form of a real data block, and such that the second data block is stored in the first storage device in the form of a pointer pointing to the real data block stored in the first storage device, not in the form of a real data block, wherein the separate data block is located in a file already stored in the first storage device or the new file;

a statistical-value update control section configured to define and update a statistical value representative of a history of reference to each data block within previous files loaded into the first storage-control communication device, and to transmit the statistical value to the second storage-control communication device;

a preloaded-block selection section configured, upon reception of the statistical value from the second storage-control communication device, to select a preloaded data block, based on the received statistical value, and to transmit from the first storage-control communication device to the second storage-control communication device a copying request for making a copy of a real data block stored in a second storage device associated with the second storage-control communication device, wherein the real data block to be copied is identical to the preloaded data block;

a preloaded-block transmitting section configured, upon reception of the copying request from the second storage-control communication device, to make the copy and to transmit the copy to the second storage-control communication device; and a preloaded-block storing section configured, upon reception of the copy from the first storage-control communication device, to store the copy as the preloaded data block in the second storage device, wherein the de-duplication control section further includes a sub-section configured, when a new data block to be newly stored in one of the plurality of storage devices is identical to the preloaded data block already stored in one of the plurality of storage devices, to convert the preloaded data block into a real data block, and to store the new data block in one of the plurality of storage devices in the form of a pointer pointing to the real block data stored in one of the plurality of storage devices, not in the form of a real data block, and wherein the first and second storage-control communication devices are interchangeable and the first and second storage devices are interchangeable.

9. The first storage-control communication device according to claim 8, wherein each statistical value associated with each data block includes at least one of a last referenced time of each data block, a count of total times that each preloaded data block was referenced, and a frequency of events that each data block is referenced during a given length of time.

10. The first storage-control communication device according to claim 8, wherein the preloaded-block selection section comprises a sub-section configured to select each of at least one of the data blocks which has the statistical value that has met a predetermined condition, as the preloaded data block.

11. The first storage-control communication device according to claim 8, further comprising a recovery section configured, when the real data block originating from the preloaded data block is lost, to recover the lost real data block, wherein the recovery section includes:

a sub-section configured to transmit a recovery request for recovering the lost real data block, to the second storage-control communication device that transmitted the preloaded data block to the first storage-control communication device; and a sub-section configured, upon reception of the recovery request from the second storage-control communication device, to retrieve the real data block from the first storage device and transmit the retrieved real data block to the second storage-control communication device.

12. The first storage-control communication device according to claim 8, further comprising a deletion section configured to delete partially a plurality of preloaded data blocks that have been stored in the first storage device, wherein the deletion section includes a sub-section configured to delete at least one of the plurality of preloaded data blocks which has met a predetermined deletion condition, to thereby prevent a maximum amount of preloaded data blocks stored in the first storage device, from exceeding a set value.

13. The first storage-control communication device according to claim 12, wherein the deletion condition relates to at least one of a count of total times that each preloaded data block was referenced, a last referenced time of each preloaded data block, and a frequency of events that each preloaded data block was referenced during a given length of time.

14. The first storage-control communication device according to claim 8, wherein each of the plurality of storage-control communication devices is in the form of a network switch device, to which the plurality of storage devices and a host device are attached.

15. A computer-readable non-transitory storage medium having stored therein a program, when executed by a computer, to implement a method of controlling a first storage-control communication device for data backup, which is associated with a first storage device, controls the first storage device, and is communicable with a second storage-control communication device via a network, the method comprising:

a first step of controlling the first storage-control communication device for data backup using a de-duplication technique, the first step including:

a sub-step of dividing a new file that is to be stored in the first storage device, into a plurality of new data blocks; and a sub-step of storing the new data blocks in the first storage device, such that, when each of at least one of the new data blocks is duplicate to a separate data block, one of the each new data block and the separate data block is selected as a first data block and the other is selected as a second data block, such that the first data block is stored in the first storage device in the form of a real data block, and such that the second data block is stored in the first storage device in the form of a pointer pointing to the real data block stored in the first storage device, not in the form of a real data block, wherein the separate data block is located in a file already stored in the first storage device or the new file;

a second step of controlling the first storage-control communication device to define and update a statistical value representative of a history of reference to each data block within previous files loaded into the first storage-control communication device, and to transmit the statistical value to the second storage-control communication device;

a third step of controlling the first storage-control communication device, upon reception of the statistical value from the first storage-control communication device, to select a preloaded data block, based on the received statistical value, and to transmit from the first storage-control communication device to the second storage-control communication device a copying request for making a copy of a real data block stored in a second storage device associated with the second storage-control communication device, wherein the real data block to be copied is identical to the preloaded data block;

a fourth step of controlling the first storage-control communication device, upon reception of the copying request from the second storage-control communication device, to make the copy and to transmit the copy to the second storage-control communication device; and a fifth step of controlling the first storage-control communication device, upon reception of the copy from the first storage-control communication device, to store the copy as the preloaded data block in the second storage device, wherein the first step further includes a sub-step of controlling the first storage-control communication device, when a new data block to be newly stored in one of the plurality of storage devices is identical to the preloaded data block already stored in one of the plurality of storage devices, to convert the preloaded data block into a real data block, and to store the new data block in one of the plurality of storage devices in the form of a pointer pointing to the real block data stored in one of the plurality of storage devices not in the form of a real data block, and wherein the first and second storage-control communication devices are interchangeable and the first and second storage devices are interchangeable.

* * * * *